(12) United States Patent
Edgar

(10) Patent No.: US 6,404,516 B1
(45) Date of Patent: Jun. 11, 2002

(54) PARAMETRIC IMAGE STITCHING

(75) Inventor: Albert D. Edgar, Austin, TX (US)

(73) Assignee: Applied Science Fiction, Inc., Austin, TX (US)

(*) Notice: Subject to any disclaimer, the term of this patent is extended or adjusted under 35 U.S.C. 154(b) by 0 days.

(21) Appl. No.: 09/255,401

(22) Filed: Feb. 22, 1999

(51) Int. Cl.$^7$ ................................................. H04N 1/04
(52) U.S. Cl. ........................ 358/487; 358/450; 382/284
(58) Field of Search ............................... 358/487, 529, 358/455, 461, 465, 509, 450; 382/284

(56) References Cited

U.S. PATENT DOCUMENTS

| | | | |
|---|---|---|---|
| 3,833,161 A | 9/1974 | Krumbein | 226/92 |
| 4,265,545 A | 5/1981 | Slaker | 356/431 |
| 4,633,300 A | 12/1986 | Sakai | 358/41 |
| 4,741,621 A | 5/1988 | Taft et al. | 356/376 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,296,925 A * | 3/1994 | Kondo | 348/208 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |

(List continued on next page.)

FOREIGN PATENT DOCUMENTS

| | | | |
|---|---|---|---|
| EP | 0580293 A | 1/1994 | |
| EP | 0 580 293 A1 | 1/1994 | H04N/1/04 |
| EP | 0 601 364 A1 | 6/1994 | H04N/1/387 |
| EP | 0669753 A | 8/1995 | |
| EP | 0 794 454 A2 | 2/1997 | G03B/27/73 |
| EP | 0 768 571 A2 | 4/1997 | G03D/13/00 |
| EP | 0794454 A | 9/1997 | |
| EP | 0 806 861 A1 | 11/1997 | H04N/1/00 |
| EP | 0 878 777 A2 | 11/1998 | G06T/5/40 |
| EP | 0 930 498 A2 | 12/1998 | G01N/21/88 |
| WO | WO 98/25399 | 6/1998 | H04N/1/38 |
| WO | WO 98/34157 | 8/1998 | |
| WO | WO 99/43149 | 9/1999 | H04N/1/100 |
| WO | WO 01/45042 A1 | 6/2001 | G06T/5/00 |
| WO | WO 01/50192 A1 | 7/2001 | G03C/7/407 |
| WO | WO 01/50193 A1 | 7/2001 | G03C/7/407 |
| WO | WO 01/50194 A1 | 7/2001 | G03C/7/407 |
| WO | WO 01/50197 A1 | 7/2001 | G03C/7/42 |
| WO | WO 01/52556 A2 | 7/2001 | H04N/9/11 |

Primary Examiner—Jerome Grant, III
(74) Attorney, Agent, or Firm—Dinsmore & Shohl LLP

(57) ABSTRACT

During electronic film development, an area of conventional photographic film is scanned several times using a single scanning station, and at each subsequent time this scanned area is advanced incrementally along the film with multiple levels of overlap with previous scans. The new image scanned at each new time is aligned to an accumulating image that has been extrapolated to the image at the new time, and then the new image is added to the accumulating image in parametric summations that allow an image to be interpolated to any time free of seams where the scans overlap. The invention further teaches a method of steering the alignment by warping the leading edge of the alignment, and a registration method of aligning multiple images that takes advantage of known fixed alignments between images.

36 Claims, 7 Drawing Sheets

U.S. PATENT DOCUMENTS

| | | | | |
|---|---|---|---|---|
| 5,371,542 A | | 12/1994 | Pauli et al. | 348/262 |
| 5,391,443 A | | 2/1995 | Simons et al. | 430/21 |
| 5,414,779 A | | 5/1995 | Mitch | 382/199 |
| 5,416,550 A | | 5/1995 | Skye et al. | 354/298 |
| 5,418,119 A | | 5/1995 | Simons | 430/507 |
| 5,418,597 A | | 5/1995 | Lahcanski et al. | 355/76 |
| 5,432,579 A | | 7/1995 | Tokuda | 354/293 |
| 5,436,738 A | | 7/1995 | Manico | 358/503 |
| 5,440,365 A | | 8/1995 | Gates et al. | 354/298 |
| 5,447,811 A | | 9/1995 | Buhr et al. | 430/20 |
| 5,448,380 A | | 9/1995 | Park | 358/520 |
| 5,452,018 A | | 9/1995 | Capitant et al. | 348/651 |
| 5,456,255 A | * | 10/1995 | Abe | 128/660.07 |
| 5,465,155 A | | 11/1995 | Edgar | 358/500 |
| 5,477,345 A | | 12/1995 | Tse | 358/500 |
| 5,496,669 A | | 3/1996 | Pforr et al. | 430/22 |
| 5,516,608 A | | 5/1996 | Hobbs et al. | 430/30 |
| 5,519,510 A | | 5/1996 | Edgar et al. | 358/471 |
| 5,546,477 A | | 8/1996 | Knowles et al. | 382/242 |
| 5,550,566 A | | 8/1996 | Hodgson et al. | 345/202 |
| 5,552,904 A | | 9/1996 | Ryoo et al. | 358/518 |
| 5,563,717 A | | 10/1996 | Koeng et al. | 358/406 |
| 5,568,270 A | | 10/1996 | Endo | 358/298 |
| 5,576,836 A | | 11/1996 | Sano et al. | 358/302 |
| 5,581,376 A | | 12/1996 | Harrington | 358/518 |
| 5,587,752 A | | 12/1996 | Petruchik | 396/315 |
| 5,596,415 A | | 1/1997 | Cosgrove et al. | 358/296 |
| 5,627,016 A | | 5/1997 | Manico | 430/434 |
| 5,649,260 A | | 7/1997 | Wheeler et al. | 396/569 |
| 5,664,253 A | | 9/1997 | Meyers | 396/603 |
| 5,664,255 A | | 9/1997 | Wen | 396/627 |
| 5,667,944 A | | 9/1997 | Reem et al. | 430/359 |
| 5,678,116 A | | 10/1997 | Sugimoto et al. | 396/611 |
| 5,691,118 A | | 11/1997 | Haye | 430/357 |
| 5,695,914 A | | 12/1997 | Simon et al. | 430/379 |
| 5,698,382 A | | 12/1997 | Nakahananda et al. | 430/418 |
| 5,726,773 A | | 3/1998 | Mehlo et al. | 358/474 |
| 5,739,897 A | | 4/1998 | Frick et al. | 355/40 |
| 5,771,107 A | | 6/1998 | Fujimoto et al. | 358/464 |
| 5,790,277 A | | 8/1998 | Edgar | 358/487 |
| 5,835,795 A | | 11/1998 | Craig et al. | 396/6 |
| 5,835,811 A | | 11/1998 | Tsumura | 396/598 |
| 5,870,172 A | | 2/1999 | Blume | 355/27 |
| 5,880,819 A | | 3/1999 | Tanaka et al. | 355/75 |
| 5,892,595 A | | 4/1999 | Yamakawa et al. | 358/530 |
| 5,930,388 A | | 7/1999 | Murakami et al. | 382/167 |
| 5,959,720 A | | 9/1999 | Kwon et al. | 355/38 |
| 5,963,662 A | | 10/1999 | Vachtsevanos et al. | 382/150 |
| 5,966,465 A | | 10/1999 | Keith et al. | 382/232 |
| 5,979,011 A | | 11/1999 | Miyawaki et al. | 15/308 |
| 5,982,936 A | | 11/1999 | Tucker et al. | 382/233 |
| 5,982,937 A | | 11/1999 | Accad | 382/239 |
| 5,982,941 A | | 11/1999 | Loveridge et al. | 382/260 |
| 5,982,951 A | | 11/1999 | Katayama et al. | 382/284 |
| 5,988,896 A | | 11/1999 | Edgar | 396/604 |
| 5,991,444 A | | 11/1999 | Burt et al. | 382/232 |
| 5,998,109 A | | 12/1999 | Hirabayashi | 430/434 |
| 6,000,284 A | | 12/1999 | Shin et al. | 73/150 |
| 6,005,987 A | | 12/1999 | Nakamura et al. | 382/294 |
| 6,057,937 A | * | 5/2000 | Shimizu | 358/302 |
| 6,065,824 A | | 5/2000 | Bullock et al. | 347/19 |
| 6,069,714 A | | 5/2000 | Edgar | 358/487 |
| 6,088,084 A | | 7/2000 | Nishio | 355/75 |
| 6,089,687 A | | 7/2000 | Helterline | 347/7 |
| 6,101,273 A | | 8/2000 | Matama | 382/169 |
| 6,102,508 A | | 8/2000 | Cowger | 347/7 |
| 6,137,965 A | | 10/2000 | Burgeios et al. | 396/626 |
| 6,200,738 B1 | | 3/2001 | Takano et al. | 430/362 |

* cited by examiner

PARAMETRIC IMAGE STITCHING

In electronic film development, conventional film is scanned electronically during development to produce a series of views of the developing image. An early scan reveals the fast developing highlight detail, while a late scan reveals slow developing shadow detail. After development, the series of views is combined into a single image in a process called stitching. In the prior art, stitching cut out the best parts of each view and merged them together. In the present invention, regression data is accumulated during development to describe a curve of density versus time of development for each pixel. After development, this regression data is used to recreate a regression curve of density versus development time for each pixel. The time at which this curve crosses a density known to give optimum grain characteristics, called the optimum density curve, is used to create the brightness for that pixel in the finished stitched image. The invention further teaches weighting regression data as a function of time and density generally following proximity to the optimum density curve.

BACKGROUND AND PRIOR ART

Recording an image at different exposures and later merging the images has been practiced since the advent of photography. A technique known to photographers for overcoming the dynamic range limit of film is to make two exposures, perhaps one for the clouds and one for the shadowed foreground, and merge the two using manual printing skill in the darkroom. A similar technique is known in astrophotography where multiple exposures reveal different features of a star cluster or nebula. In a rather flashy example, Kodak developed a film in the 1950's capable of recording the million to one brightness range of a nuclear test by making a color negative film wherein the three color layers were substituted with three monochrome layers of widely different sensitivities, each developing in color developer with a different dye color. Again, the manual skill of a darkroom printer was relied on to merge the images into one. A further example can be found in radiology where images can be made with different x-ray voltages to reveal detail in both soft and hard materials, then merging the images together. Modem color film typically uses three emulsion coatings for each color, each of a different speed. The three are merged simply by putting all three together in one film, thereby getting some benefit of a layer optimized for a particular exposure, but mixed with the grain of other layers not optimized for that particular exposure.

It was not until the advent of electronic film development, as taught in U.S. Pat. No. 5,519,510 issued to the present inventor, that there was a need to merge multiple exposure images using production-level speed and automation. In electronic film development, the merging of images is called stitching. The background of electronic film development in general and the prior art methods of stitching are now presented as a basis of understanding the background of the present invention.

Turning to FIG. 1, a scene 102, portrayed as perceived through the wide dynamic range of the human eye, has highlights 104, midtones 106, and shadows 108, with details in all areas. A camera 110 is used to project the scene onto a film inside the camera. The scene is perceived by the film to consist of points of light, each with an exposure value which may be mapped along an exposure axis 112.

The film is removed from the camera after exposure and placed in a developer. In electronic film development, an electronic camera 120 views the film by nonactinic infrared light during development. As seen after a short development time of perhaps one minute, the film 122 still has a low density for shadows 124 and midtones 126, but may optimally reveal highlights 128. As seen by the infrared camera 120, inverting for the negative of conventional film, the shadows and midtones 130 appear black, while the highlights 132 are seen more clearly than at any later time in development.

Doubling development time to two minutes, the midtones 140 have progressed to an optimum density while the highlights 142 may already be overdeveloped and the shadows 144 may still be too low in density to reveal a clear image. The film 146 would appear to have good midtone detail 148, but the highlights 150 are already white, while the shadows 152 are still black.

Doubling development time again to a total of four minutes, the shadows have now reached an optimum density, but the other exposures are overdeveloped such that in image 162 they may appear white with little detail.

For each exposure, there is an optimum density of development to reveal the clearest image. Clarity may be defined technically as the best signal to noise ratio, where signal is the incremental change in density with exposure, and noise is the RMS deviation in density across a region that has received uniform exposure, by convention scanned with a 24 micron aperture. For example at one minute of development time, the midtones 126 typically have too low a density, or are too dark, to have enough of a signal level to reveal detail through the noise of the film and capture system. On the other hand, at four minutes the midtones 164 are "washed out", such that not only is their contrast, or image signal strength, too low, but the graininess of an overdeveloped silver halide emulsion gives a high noise. There exists a development time in between these extremes, two minutes in this example, wherein the midtones 140 have developed to an optimum density that yields the best signal to noise ratio, or image clarity, for that particular exposure value. In this example, the shadows reach optimum clarity at four minutes of development 160, and the highlights reach optimum clarity at one minute of development 128. In general, the optimum density will be different for different exposures, as in this example wherein the shadows 160 reveal best clarity at a lower density than the highlights 128.

After the final capture of the image on the film at four minutes, electronic film development has captured optimum images for shadows, midtones, and highlights albeit at different development times. These optimum images must be combined to form a single image with clarity throughout approximating the original scene as seen by the wide dynamic range of the human eye. The process of combining these different parts of the image is called stitching. The prior art conceived this in the classic sense of merging multiple films in a darkroom by cutting out the shadows, the midtones, and the highlights, lightening and darkening each so the boundaries between regions aligned, then stitching these multiple images together into one.

The advantage of electronic film development is now more easily understood. In conventional development the film must be stopped and fixed at a selected development time, such as the two minute development time of this example. The detail of the highlights revealed at one minute is lost in total darkness as conventional development proceeds. Likewise, the detail that might have been revealed at four minutes never had the chance to be born in conventional development. Electronic film development turns conventional film into a "universal" film that can be used at a wide range of exposure indexes, including very high exposure indexes not currently practical.

In FIG. 1, the section of the density curve around the optimally developed shadows 160 is copied as segment 170. Next, the density curve around the optimally developed midtones 140 is raised on a base value, or pedestal 172, and copied next to curve 170 as curve 174. The height of the pedestal 172 is adjusted so the two curves 170 and 174 align. Similarly, the curve around the optimally developed highlights 128 is adjusted and raised on pedestal 176 to produce curve 178. The process works in theory, but in practice, development nonuniformities across the image and other spatially dependent nonlinearities made the curves difficult to match across an entire image so that the stitched image usually displayed contours at the edges of stitching regions. Obviously, an improved method of stitching was needed to realize the full benefits of electronic film development.

Often in electronic film development there are more than three exposures made of the film. For example, an area array camera may view the film continuously, generating hundreds of exposures. In the prior art these needed to be combined into a limited number of images to conserve memory during the capture process. For example, in FIG. 2 the exposures made at one-half and one minute, exposures 202 and 204, respectively, could be added with function block 206 to produce a single short development image 208. Similarly, various exposures at other development times could be added to yield a middle development image 210 and a late development image 212. These images would then be aligned, cut, and pasted together at function block 220 to yield the finished image 222. A problem is immediately seen if the times of capture vary, making it necessary to adjust the densities in each of the intermediate images by known time deviations. In the past the adjustments were based on estimations of development speed, and were not found to be reliable. In addition, there were difficulties if some of the capture times were missing entirely because, perhaps, a non real time operating system did not release computer resources exactly when needed.

Electronic film development held the promise of higher speed universal film that would work in conventional cameras. This higher speed and wider range film would enable families to record their lives beautifully in the natural light of real life, without typical problems caused by contrast light or dependence on a cold and harsh flash. However, the prior art implementations of electronic film development were plagued with problems in stitching the multiple exposure images together. Obviously, an improved stitching method is an important advance to the art.

OBJECTS OF THE INVENTION

The primary object of the invention is to merge images of differing densities into a single image which is free from the artifacts encountered in the prior art.

A related object is to merge images of differing densities free of edge contouring.

A further object is to merge images of differing densities with reduced effect from nonimage noise.

A further object is to merge images of differing densities while compensating for a shift in a density-affecting parameter, such as time.

Another object is to recover missed images in a series of images of differing densities that are to be merged.

SUMMARY OF THE INVENTION

In the present invention, a series of images are captured electronically from a developing film, each tagged with the time of capture. For each pixel of each image at each time, regression parameters are calculated, such as density times time, or density times time squared. These parameters for each time are summed into parameter accumulating arrays. As a refinement, the parameters can be weighted prior to summing by a factor sensitive to the reliability of each sample. Following film development, the regression statistics are not necessarily viewable images, rather they describe in abstract mathematical terms smooth continuous lines for each pixel that pass through the actual sampled densities for each pixel. These mathematically described smooth lines allow the development to be recreated mathematically in order to find the nonquantized time at which the density of each pixel is predicted to have attained its optimum density. A gamma correction function of this nonquantized time for each pixel is then output as the brightness for that pixel.

DETAILED DESCRIPTION OF THE INVENTION

Figure 1:
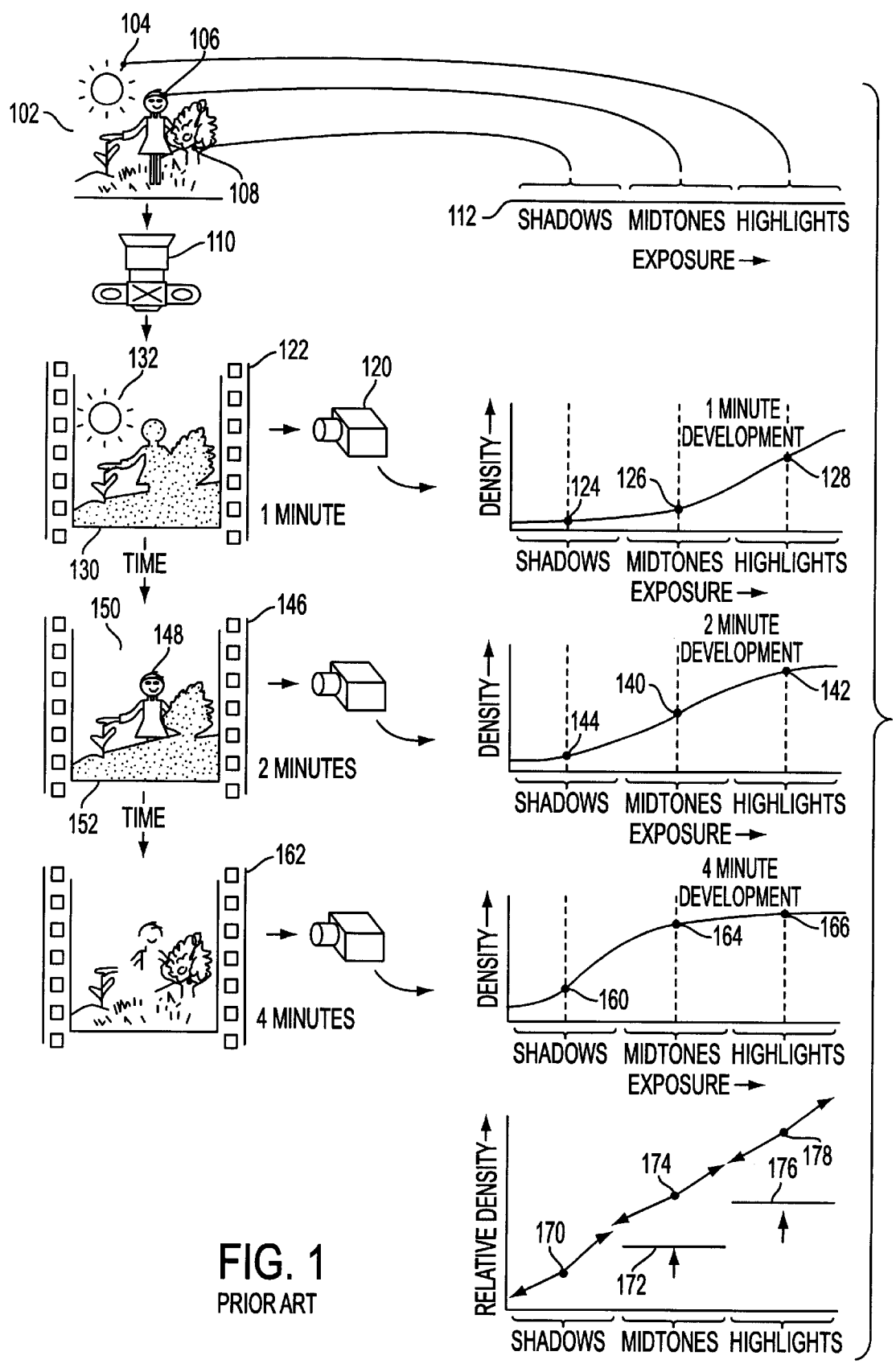
FIG. 1 depicts the prior art of electronic film development with stitching.
Figure 3:
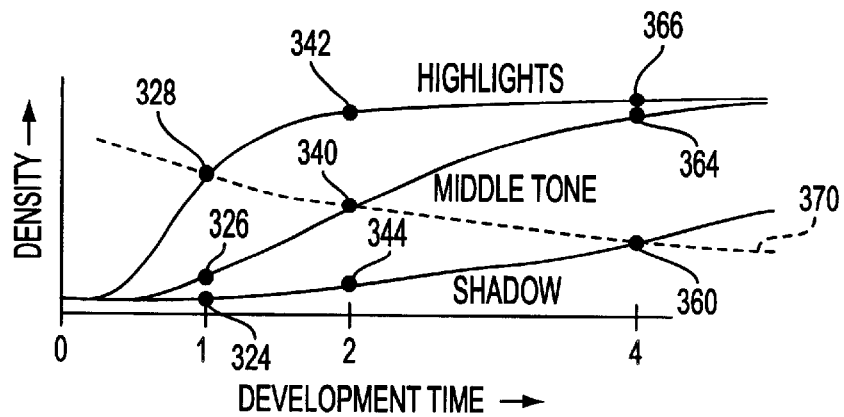
FIG. 3 portrays density versus time of a typical development cycle.

Sometimes a different way of looking at a problem makes it easier to recognize a new solution. The graphs of FIG. 1 described above in the background section followed the prior art photographic convention of plotting density as a function of exposure for a series of specific development times. FIG. 3 follows a much less common approach of plotting density versus development time for a series of exposures. Other than that, the points 324, 326, 328, 344, 340, 342, 360, 364, and 366 in FIG. 3 intersect exactly the same triplet of density, development time, and exposure as their similarly numbered counterparts 124, 126, 128, 144, 140, 142, 160, 164, and 166 of FIG. 1.

The optimum density point for highlights 328, for midtones 340, and for shadows 360 lie on a locus of points called the optimum density curve 370, shown by a dotted line in FIG. 3. This curve is found empirically by measuring signal to noise ratio for varying exposures, and finding the density at which each reveals detail with the optimum clarity.

Figure 4:
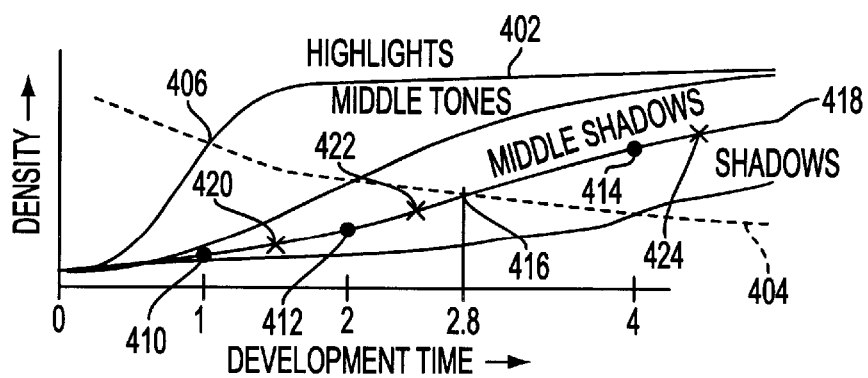
FIG. 4 introduces the graphic basis of the invention.

An image can be thought of as consisting of an array of points, or pixels, each of which receive a specific exposure. The prior art of FIG. 1 thought of this exposure as producing a specific density. Further, each development time produced images of differing density that could be cut, aligned in density, and merged together. FIG. 4 suggests thinking of the image as consisting of an array of pixels, each having received a specific exposure resulting in a specific development curve, such as the highlight curve 402. Each specific development curve can be quantified by the time at which the density of the development curve crosses the optimum density curve 404. In this case a specific highlight pixel produces curve 402, which crosses curve 404 at point 406, which can be tagged as a one minute pixel.

Continuing with FIG. 4, assume a pixel in a middle shadow developed to densities at one, two, and four minutes shown by solid dots 410, 412, and 414. Although none of these densities falls directly on the optimum density curve 404, this way of seeing the problem makes it clear that a best fit line 418 could be drawn through the known points 410 to 414 to predict that the pixel crossed the optimum density curve 404 at point 416, so that pixel can be tagged as a 2.8 minute pixel. This method requires no cutting and aligning of multiple images; rather the placement of the best fit line provides a continuum between areas of differing exposure, completely eliminating edge contouring and thereby solving a significant problem in the prior art.

Figure 2:
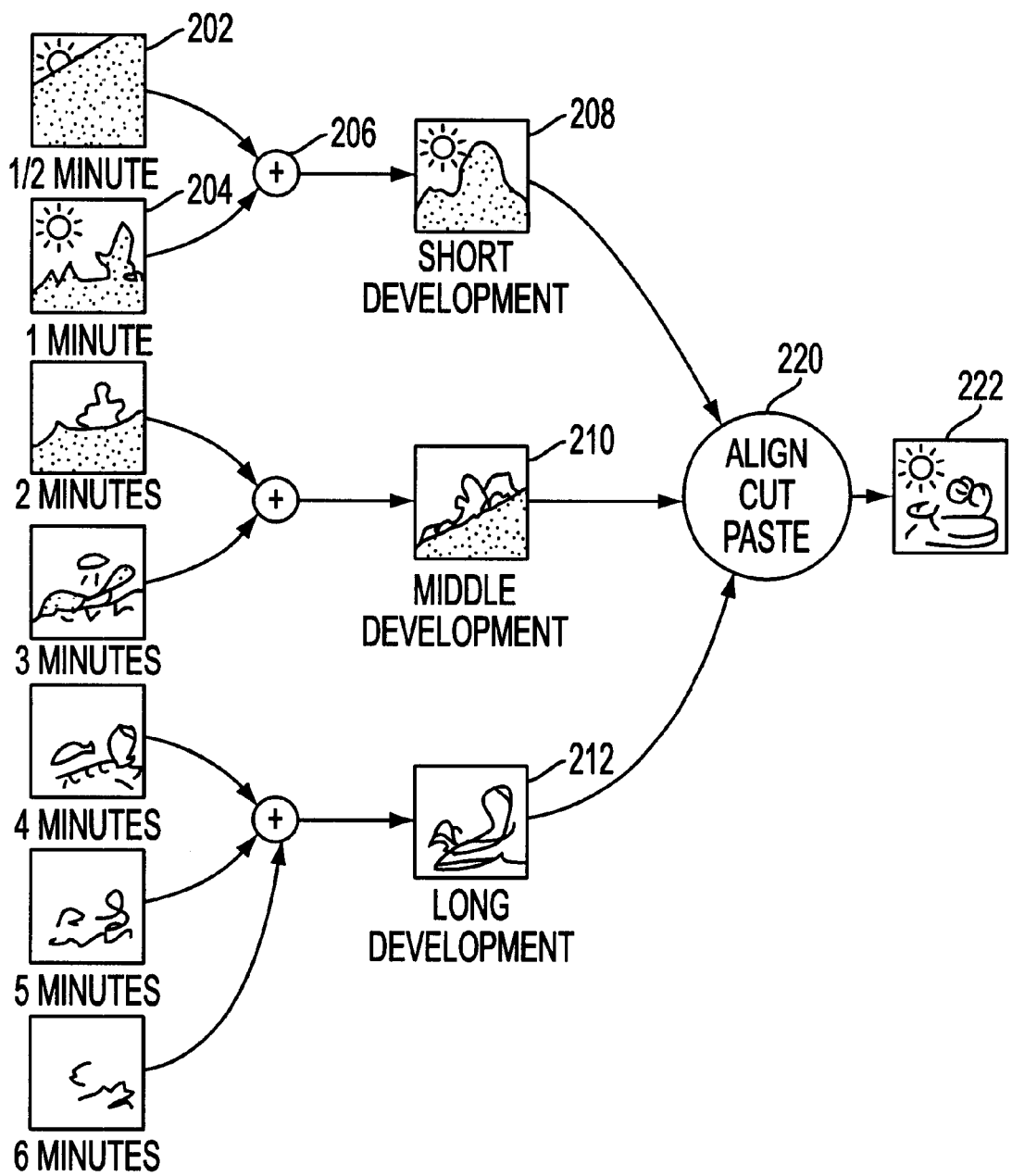
FIG. 2 further portrays prior art stitching.

Further, assume that there was a time base error in sampling the data. In the prior art of FIG. 2, an attempt to correct the error would have involved estimating what effect that error had on the early, middle, and late images. In the case of FIG. 4, however, the error would appear as a shift in the sample times, for example 1.5, 2.5, and 4.5 minutes shown by the x's 420, 422, and 424. It may be noted that the shifted sample times would still lie along line 418, and therefore the best fit line to points 420, 422 and 424 and the best fit line to 410, 412 and 414 is the same line 418 which still crosses the optimum density curve at the same point 416 at 2.8 minutes. In fact, individual sample points could be added, deleted, or moved in time with minimal effect on the best fit curve or the estimate of the crossover time, thereby solving another significant problem in the prior art.

Figure 5:
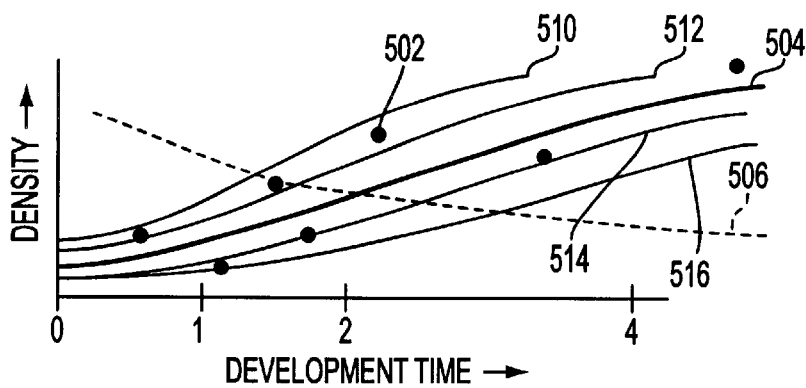
FIG. 5 adds to FIG. 4 the effect of measurement noise and timebase shift.

FIG. 5 illustrates a more typical case wherein the electronic camera adds noise to the captured images. In this case, each capture will not only lie along a line that is a function of film exposure and grain, but in addition each capture adds a random noise deviation from the line. The individual density samples for a particular pixel are illustrated in FIG. 5 as solid dots, such as dot 502 measured at a time of 2.3 minutes. The density of sample 502 differs from a theorized true curve 504 because of noise in the electronic camera arising from, typically, statistical errors in counting photons, called shot noise. Combined with several other samples, however, illustrated in FIG. 5 as the multiple solid dots, a best fit curve 504 can be estimated, and the time this best fit curve 504 crosses the optimum density curve 506 calculated, as before.

A particular question arises from FIG. 5 as to how to specify a best fit curve, and the answer provides another distinction in the practice of the invention over the prior art. Well known statistic practices give an array of choices. One option is to gather regression parameters on the points, and then calculate a linear best fit from the sum of densities and the sum of densities times time. By including the sum of densities times time squared as one of the parameters, a quadratic regression can be used to yield a quadratic function for the best fit curve. Best fit regression analysis of such parameters is well known in the art. For example, a linear best fit is a curve of the form density=A+Bt, where A and B are found such that the sum of the square of the distances of each sampled point from the line is minimized.

Now one of the distinctions in the practice of the invention over the prior art can be stated. Unlike the prior art which sought to gather actual images from the film at specific zones of development time and later merge those real images, the present invention seeks to gather more abstract regression parameters about the developing image and later use those parameters to recreate a real image for any conceivable development time. The mathematical expression of the image as a function of a time continuum then allows a seamless stitching.

A particularly interesting best fit function is the locus of lines representing the developed density versus time as a function of exposure level for similar film, such as curves 510, 512, 514 and 516. The best fit curve could be described mathematically as density=F(t,tc), where t is any development time at which density is to be solved, and tc specifies the shape of the curve to cross the optimum density curve 506 when t=tc. The curve with the best fit to the sampled data, curve 504 in this example, is selected, and the crossover time read directly as the variable.

The best fit curve could also be described mathematically as F(t,e), where e is the exposure level yielding a particular curve. This locus of lines can be derived by actually developing a series of test films given known exposures, and storing the actual measured densities of each as a function of development time t in a lookup table where one axis of the lookup table is the known exposure, a second axis is the time since developer induction that a specific measurement is made, and the value stored in the lookup table is the empirically measured density. To distinguish such a curve repertoire from a repertoire of mathematically simple curves, such as a series of lines in linear regression or curves described by a quadratic formula in a quadratic regression, such a regression will be called an empirical curve regression after the locus of curves derived from empirically measuring film during development. Any specific curve can be read from the lookup table by selecting a particular exposure value as one axis of the lookup table, and then varying time, the other axis, while reading out density. The value of exposure yielding the curve with the best fit is the best fit curve.

The parameters gathered to specify one of the repertoire of available curves in the lookup table can be derived by summing the density of each sample point times functions of time. A first parameter is the product of a first function of time, a second parameter is a second function of time, and so forth. For example, in a quadratic regression, one of the functions of time is time squared. These functions of time are derivable from the empirical curves. The first function can be related to an average of the curves. The second function can be the primary mode by which the curves differ from this average, called the residue after the first function has been subtracted from each curve. The third function can be the main remaining residue after removing the components of the first and second functions, and so forth to whatever order is desired.

Another interesting parameter set is based on a gaussian function of time, where the gaussian function is taken to be a function of time that rises and falls smoothly in a bell shape to select a particular period of time. A series of parameters based on such overlapping gaussian functions would specify the smooth shape of a curve. The use of such curves may be found in the art, especially in spatial transforms where the human retinal neural system is found to respond to gaussian and difference of gaussian (DOG) functions.

Figure 6:
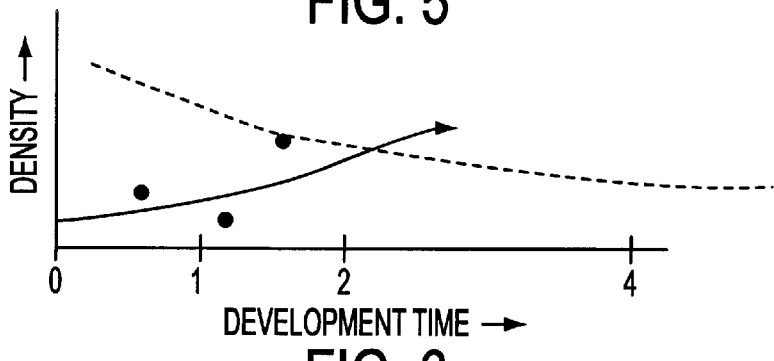
FIG. 6 adds to FIG. 5 the effect of lost data.

Turning now to the next illustration, FIG. 6 illustrates the case of a real time operating system that terminated capture prior to reading all the data. Even though data, as represented by solid dots, was not received up to the optimum density time, nevertheless the best fit method allows a curve to be found and projected through the optimum density curve. Although this would not produce the most grain free image, it would produce an acceptable image under conditions in which the prior art would have struggled because there were no middle and late exposures to stitch. This ability to recover from a failure is again a significant advance over the known art.

Figure 7:
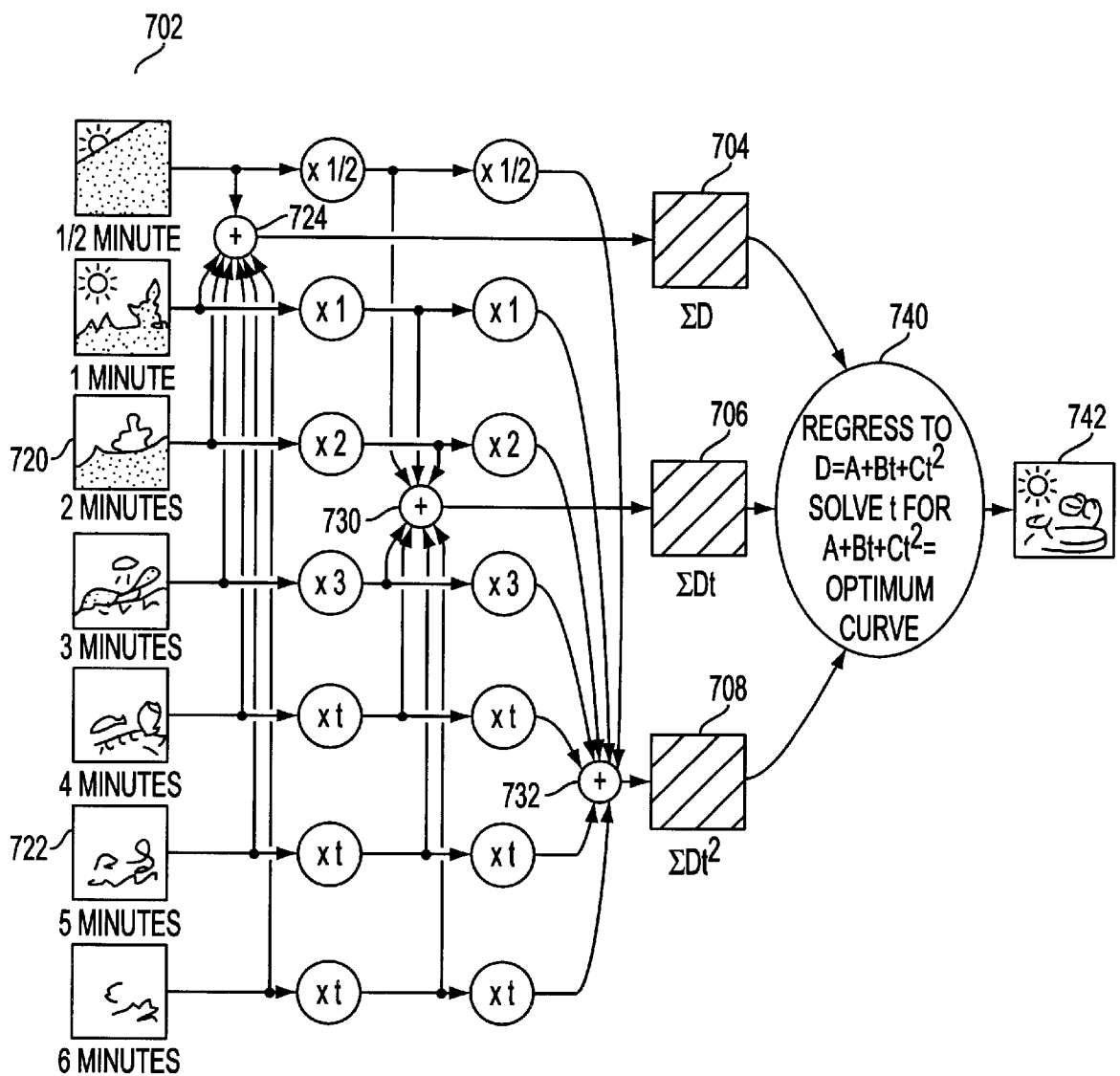
FIG. 7 portrays an unweighted embodiment of the invention schematically.

Now that the basis of the invention is understood, a specific embodiment using quadratic regression is presented schematically in FIG. 7. FIG. 7 inputs the same sequence of seven scanned images 702 and requires the intermediate storage of three accumulating arrays 704, 706, and 708, as shown in the prior art example of FIG. 2. The distinction over the prior art is that in FIG. 7, the accumulating arrays sum regression statistics rather than images. This is emphasized by portraying the three accumulating arrays 704, 706 and 708 with crosshatching to indicate they are not meant necessarily as viewable images, but rather as statistical data.

In FIG. 7 a series of images 702 is received sequentially from an electronic camera viewing the developing film. For example, image 720 is received at two minutes of development. The density of each pixel of image 720 is summed with the density of corresponding pixels of images taken at other development times, such as image 722 at five minutes. This summation occurs in function block 724 which can either operate on all images together if they have all been accumulated and stored in memory during development, or one by one as they are captured from the electronic camera at the corresponding development times. The advantage of summing them as they are captured is that less memory is required. The resulting sum from function block 724 is stored in the accumulating array 704.

Continuing the process of the present invention, the density of each pixel of image 720 is multiplied by time, two minutes in this example, and the product summed with the density times time of corresponding pixels of images representing other development times, such as image 722, for which t=5 minutes. This summation occurs in function block 730, and the summation from function block 730 is stored in the accumulating array 706. Finally, the products of density times time are multiplied by time again to yield density times time squared, and the summation derived at function block 732 is stored in the accumulating array 708. In the alternative, the process could continue to a cube or higher orders of time to support a cubic or higher order regression, or could end before the square term to support a linear regression.

After the last image is captured and its statistics summed to the accumulating arrays, then a best fit curve is derived for each pixel by retrieving the corresponding statistical data for that pixel from the accumulating arrays 704, 706 and 708. The time of intersection of the best fit curve for each pixel with the optimum density curve is calculated in function block 740, and a function of this time stored for the corresponding pixel in the finished image array 742. The function stored in the final image array 742 can be the time directly; or it can be the exposure known empirically to develop to the particular time, found empirically and expressed in the computer as a function, such as through a lookup table, of the time; or it can be any other function found to have utility, such as the square root of the linear exposure value normalized and stretched to fit white level and black level, yielding a conventional 8 bit computer image representation.

Figure 8:
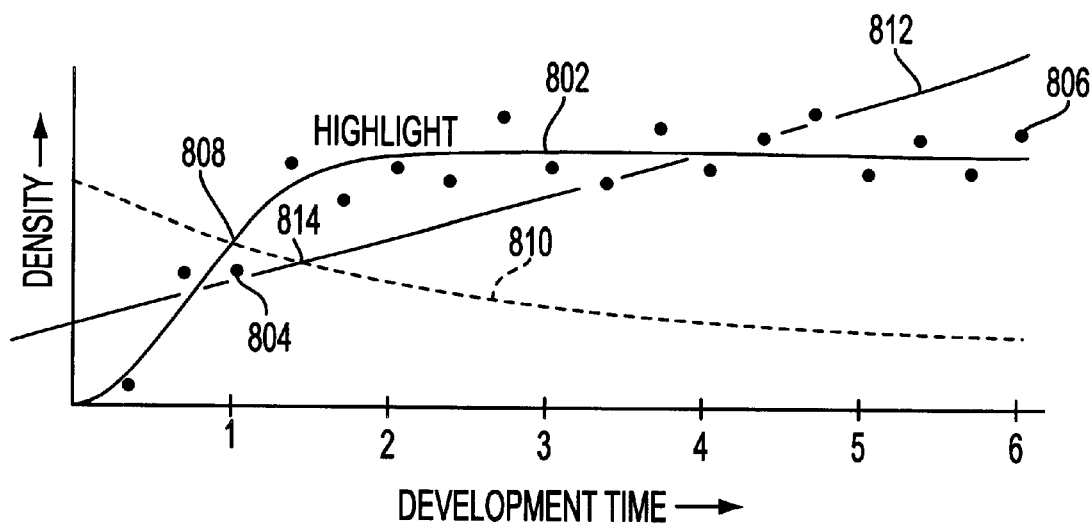
FIG. 8 illustrates a problem with an unweighted embodiment.

The direct parametric embodiment just presented does have limitations that are now highlighted with reference to FIG. 8. In this figure, a specific highlight exposure curve 802 is plotted as density versus development time. A series of noisy samples are represented by solid dots such as dot 804 representing a noisy measurement of density at one minute, and dot 806, representing a noisy measurement of density at five minutes. The goal is to find the crossover time 808, one minute in this example, where curve 802 crosses the optimum density curve 810, with the added constraint that this point 808 be found without exactly knowing curve 802, only the noisy measurements such as 804 and 806.

An immediate problem which is evident is that a linear regression curve, such as straight line 812, will be significantly affected by samples distant from the optimum density time, such as sample 806, and as a result the best fit linear curve 812 will intersect the optimum density curve 810 at an incorrect time 814. If this merely added a bias error, it would not be a significant problem; however, changes in the outlying samples, such as 806, can be seen to change the crossover time 814, and because outlying samples such as 806 bear almost no real information, this change is an unwanted noise. It should be noted that higher order regressions, such as the quadratic of FIG. 7, would put less emphasis on outlying points; however, higher order regressions require more accumulating arrays than a linear regression and correspondingly more memory and computing power, and the reduction in emphasis of outlying points is not precise or complete.

Figure 9:
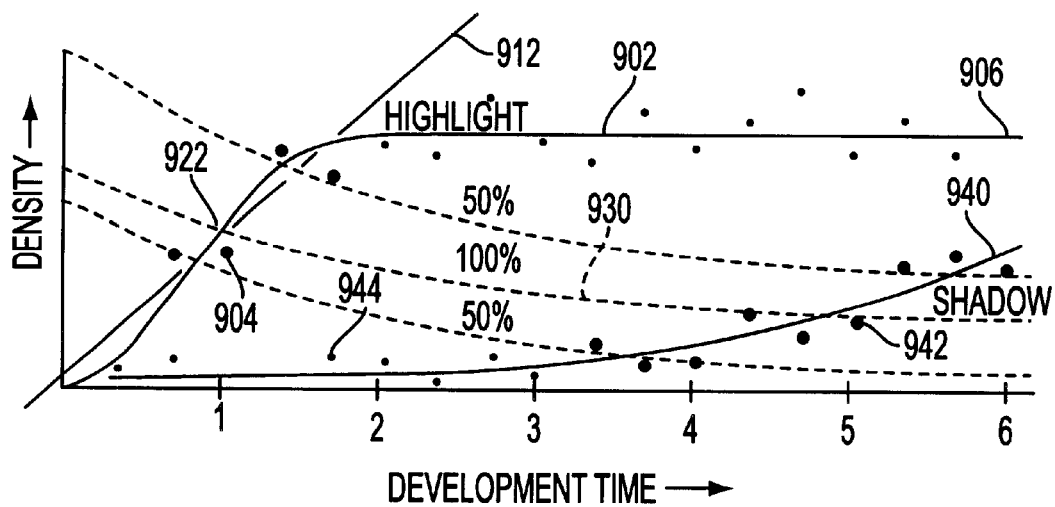
FIG. 9 portrays weighting proportional to proximity to an optimum density curve.

A solution to this problem is presented in FIG. 9. Basically, the statistics for each sample are throttled by a weighting factor, In this example, sample 904 (equivalent to sample 804 of FIG. 8) is given a high weight, while sample 906 (equivalent to sample 806 of FIG. 8) is given a very low weight. In this specific example, weighting factors are assigned such that a linear regression yields straight line 912, which is much closer to the true curve 902 in the region around the crossover time 922, at the expense of deviating at outlying times, such as six minutes, for which accuracy is irrelevant. Thus, one object of this invention to reduce noise is accomplished via application of a weighting factor.

The weighting function should generally follow the reliability, or signal to noise ratio, of each sample. The crest of the weighting function should therefore follow the optimum density curve, shown in FIG. 9 as the 100% weighting curve 930, and fall off in proportion to distance from this curve. To illustrate the application of this weighting process, sample points such as 904 that are close to the optimum density curve are shown large, while sample points such as 906 that are distant are drawn faintly. In this specific example, only the 100% and 50% weighting curves are shown, although normally, the falloff would be a continuous function of distance.

The rate of falloff with distance follows the rate of falloff of overall signal to noise ratio including both film grain and noise in the electronic capture system, and is found empirically. If the capture system is very noisy, the falloff is slower so more points are averaged. If the capture system is noise free or the film has a narrow range of optimum densities, then the weighting falloff is rapid. In practice there is a wide tolerance, and a curve such as shown in FIG. 9 will be very close to optimum for a range of films.

FIG. 9 further portrays the true curve 940 for a shadow exposure with the actual sample points from which the true curve is to be mathematically estimated. Again, sample points such as 942 that are proximate to the optimum density curve 930 are portrayed large to indicate a high weighting, while outlying sample points, such as 944, are drawn faintly.

Again it may be visualized that a best fit linear line through the large points around curve 940 will closely approximate curve 940 around five minutes at which time the curve crosses the optimum density point. Curve 940 is included to point out that a weighting factor proportional to distance from the optimum density curve will tend to emphasize samples at short development times with highlight exposures, and samples with long development times for shadow exposures.

Finally, it should be noted that the weighting factor should not drop to zero at very low densities or short times, but should maintain some finite weight. This insures that even if the system fails to capture samples at later times, there will be some regression data in the accumulating arrays from which a reasonable guess at the best fit curve can be extracted. Therefore, sample point 944 would be given a small but non-zero weight. The weight can, however, go to zero for high densities and long times.

Figure 10:
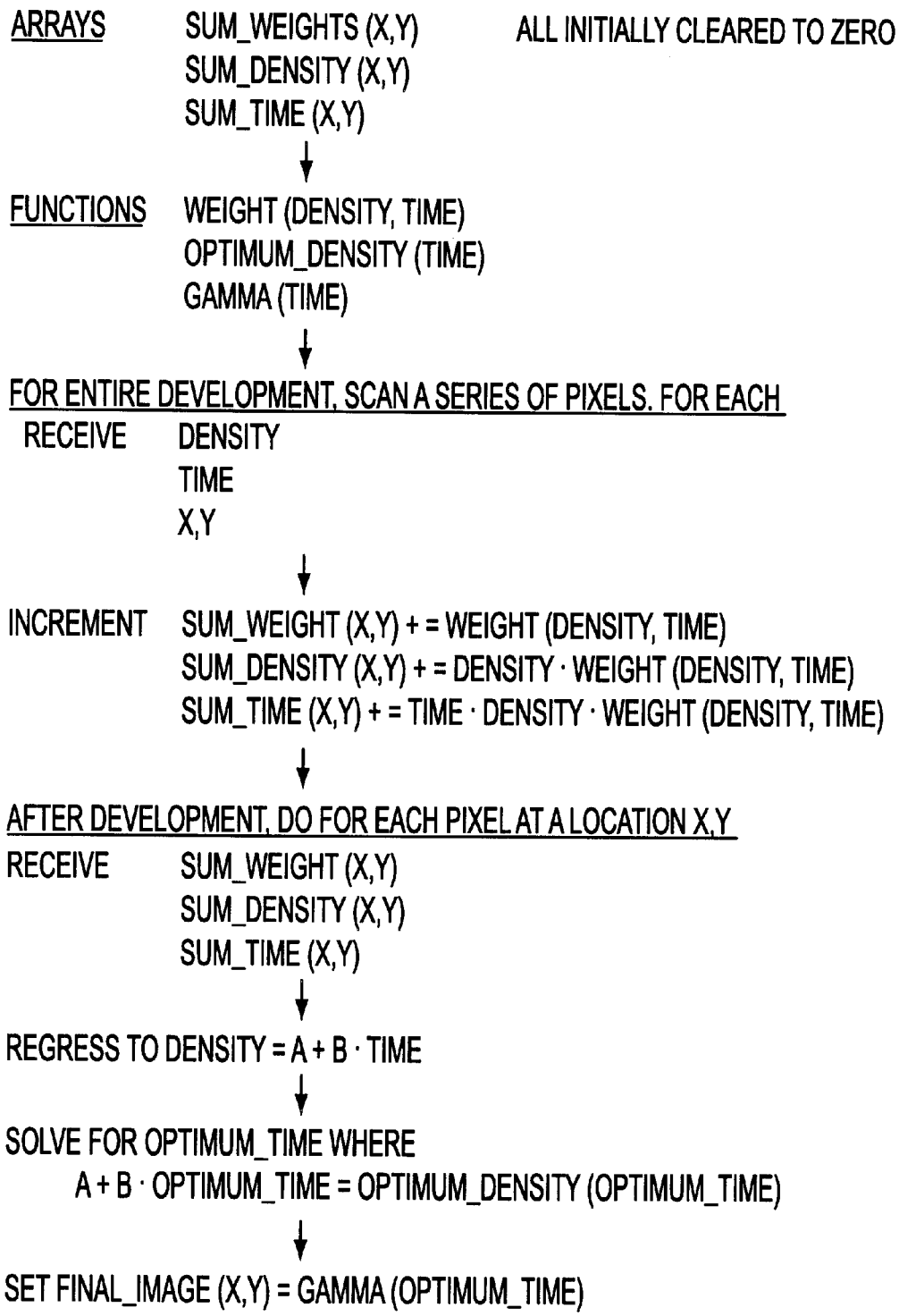
FIG. 10 presents the preferred embodiment as a series of steps.

FIG. 10 portrays the embodiment just described as a series of steps such as would be implemented in a computer program. The specific example given is one of linear regression.

Initially, there are available to the process three arrays to hold the regression statistics. All the elements of these regression arrays are initially set to zero. Three functions are also available: a first function receives a density and time as parameters and returns a weight factor, a second function receives time as a variable and returns an optimum density, and a third function receives a crossover time as a parameter and returns a brightness value artistically representative of the light the crossover time represents, which is typically the square root of linear brightness, called a gamma correction.

During development, an electronic camera views the film. The image from the camera is digitized into pixels. As the process continues, each point from the film is sensed at several times. The process receives these pixels one at a time, receiving for each pixel four numbers: a density, x and y coordinates of the pixel, and a time at which the specific density was measured.

Based on these four numbers for each pixel, regression parameters are calculated and collected. Specifically, regression parameters are calculated based on density and time, and array elements in the regression summation arrays pointed to by x and y are incremented by the regression parameters.

After the last pixel is received for the last time, the summation arrays are complete, and the data they hold can be used. For each x, y location, regression data is read from the arrays and used to calculate a linear best fit curve. The time at which this best fit curve crosses the optimum density curve is calculated, or read from a lookup table, or solved by iteration. Finally, the equivalent x,y element of a final image is set according to a gamma function of this crossover time.

Figure 11:
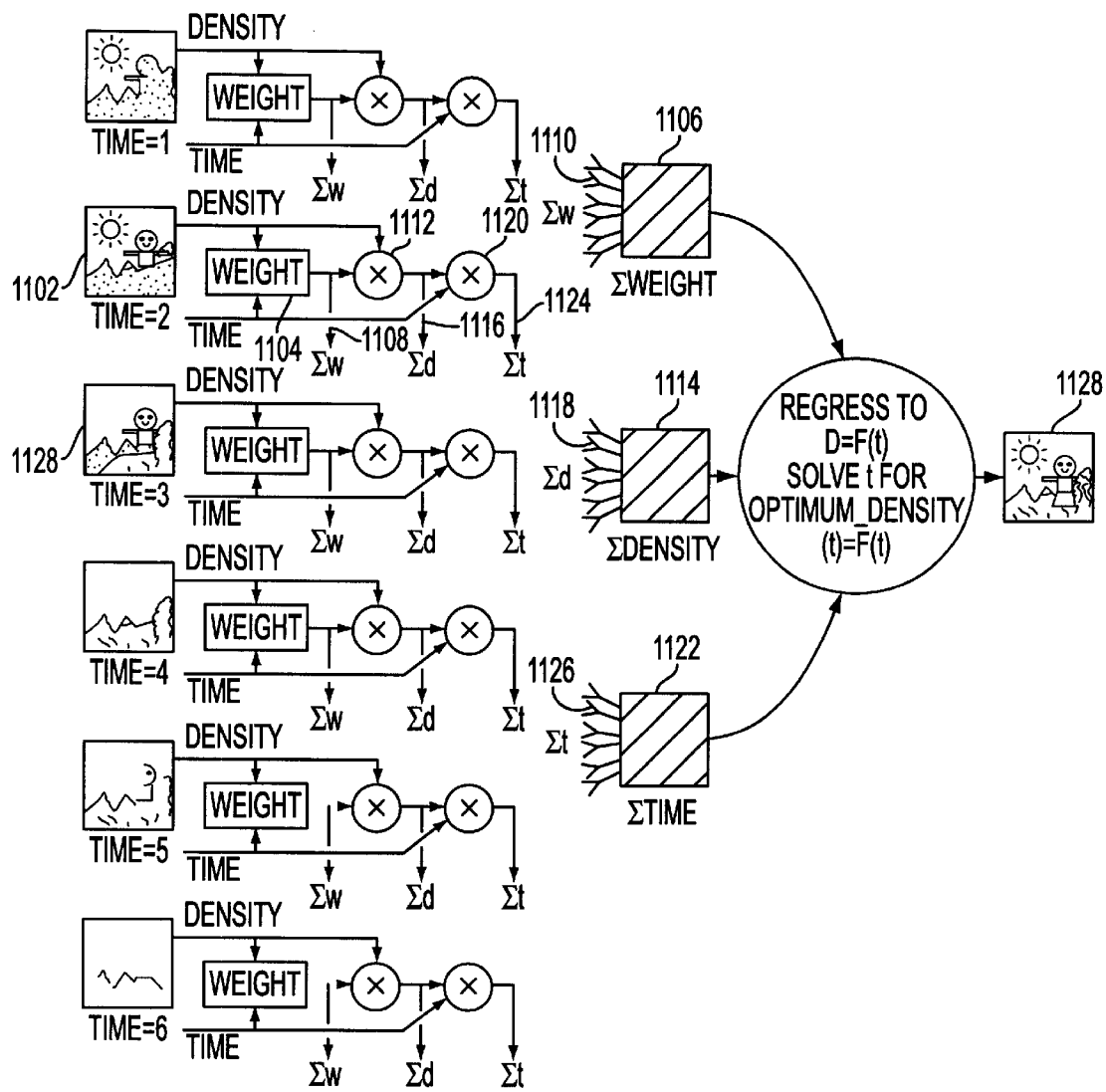
FIG. 11 presents the preferred embodiment schematically.

FIG. 11 covers the procedure of FIG. 10 schematically. A series of images are received from an electronic camera viewing a film at specific times since a development has been induced. For example, image 1102 is received for two minutes of development. A function such as 1104 labeled "weight" receives the time and also receives the numeric density of each pixel in the image, returning for each pixel a first value that sums to the corresponding pixel in a "summation weight" array 1106 via conduit 1108 terminating in 1110. This first value is also sent to multiplication block 1112 along with the numeric density of each pixel to produce an output product "summation density" for each pixel. "Summation density" sums to the corresponding pixel in "summation density" array 1114 via conduit 1116 and 1118. Another multiplication block 1120 also receives this "summation density" for each pixel, further receives the corresponding time, and outputs a product called "summation time" for each pixel that is the product of weight, density, and time. "Summation time" sums to the corresponding pixel in the "summation time" array 1122 via conduit 1124 and 1126. The process is repeated for each new image, such as image 1128, that is received by the electronic camera captured at a different development time.

Following development, the three parametric arrays 1106, 1114, and 1122 are used to calculate a brightness value for each pixel. The three values received for each pixel from the three arrays can be used to regress to a linear equation of the form density=A+Bt, and t allowed to vary iteratively to solve for the time at which a function optimum_density(t)= A+Bt. A faster method divides the two values from the summation weight array and summation time array by the corresponding value from the summation density array, and the resulting two numerical values are used as a pointer into a two dimensional lookup table that holds the precalculated time, or a gamma function of the time. Finally, the value so found is placed into the corresponding pixel of the finished image 1128, which now, with the full brightness perception range of the human eye, is seen to be Shirley and little Albert frolicking in the bluebonnets.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention

What is claimed is:

1. A method of monitoring change with time of an image comprising a plurality of pixels possessing densities that are functions of time, comprising the steps of:

receiving a first density of a pixel at a first time, accumulating to a first parameter sum a first function of the first density and the first time, accumulating to a second parameter sum a second function of the first density and the first time, receiving a second density of the pixel at a second time, accumulating to the first parameter sum the first function of the second density and the second time; and accumulating to the second parameter sum the second function of the second density and the second time.

2. The method of claim 1, wherein the first function has a nonzero value at the first time and the second time.

3. The method of claim 1, wherein the first function is a product of a density and a function of time.

4. The method of claim 3, wherein the function of time is time squared.

5. The method of claim 3, wherein the function of time is time.

6. The method of claim 3, wherein the function of time is derived from differences in empirical curves of density versus development.

7. The method of claim 3, wherein the function of time is a gaussian function of time.

8. The method of claim 3, wherein the first function further includes weighting by a function of the density.

9. The method of claim 8, wherein the weighting is a function of density and time.

10. The method of claim 9, wherein for a selection of values the function has greater weightings for values closer to an optimum density curve.

11. The method of claim 8, further comprising the step of accumulating the weighting to a third parameter sum.

12. The method of claim 1, wherein the plurality of pixels is associated with an associated plurality of first parameter sums and an associated plurality of second parameter sums.

13. The method of claim 12, further comprising the step of deriving a best fit line to a continuum of densities of a pixel as a function of time, wherein the deriving step uses the first and the second parameter sums associated with the pixel.

14. The method of claim 13, wherein the deriving step includes a polynomial regression.

15. The method of claim 14, wherein the deriving step includes a linear regression.

16. The method of claim 14, wherein the deriving step includes a quadratic regression.

17. The method of claim 13, wherein the deriving step includes an empirical regression.

18. The method of claim 13, wherein the deriving step includes a gaussian regression.

19. The method of claim 13, further comprising the steps of:
selecting an optimum density curve, and
solving for a crossover time at which the best fit line crosses the optimum density curve.

20. The method of claim 19, further comprising the step of creating an image in which a value of the pixel is a function of the crossover time.

21. A method of monitoring change with time of an image comprising a plurality of pixels, each pixel having a density that is a function of time, comprising the step of:
receiving densities of the pixels at a plurality of times;
accumulating to a first parameter sum for each pixel a first function of the density and the time; and
accumulating to a second parameter sum for each pixel a second function of the density and the time,
wherein the first and second sums for each pixel offer a continuum between areas of differing exposure among the plurality of pixels providing seamless stitching of the image.

22. The method of claim 21, wherein the plurality of times includes three distinct times.

23. The method of claim 21, wherein the first function is a product of a density and a function of time.

24. The method of claim 23, wherein the first function further includes weighting by a function of the density.

25. The method of claim 24, wherein the weighting is a function of density and time.

26. The method of claim 21, further comprising the step of accumulating to a third parameter sum for each pixel a third function of the density and the time.

27. A method of monitoring change with time of an image comprising a plurality of pixels, each pixel having a density that is a function of time, comprising the steps of:
receiving densities of the pixels at a plurality of times;
accumulating to a first parameter sum for each pixel a first function of the density and the time; and
accumulating to a second parameter sum for each pixel a second function of the density and the time;
wherein the first function is a product of a density and function of time and the first function includes weighting by a function of the density; wherein the weighting is a function of density and time; and wherein for a selection of values the function has greater weightings for values closer to an optimum density curve.

28. The method of claim 24, further comprising the step of accumulating the weighting to a third parameter sum for each pixel.

29. A method of monitoring change with time of an image comprising a plurality of pixels, each pixel having a density that is a function of time, comprising the steps of:
receiving densities of the pixels at a plurality of times;
accumulating to a first parameter sum for each pixel a first function of the density and the time;
accumulating to a second parameter sum for each pixel a second function of the density and the time; and
deriving a best fit line to a continuum of densities for each pixel as a function of time,
wherein the deriving step uses the first and the second parameter sums associated with each pixel.

30. The method of claim 29, wherein the deriving step includes a polynomial regression.

31. The method of claim 29, further comprising the steps of:
selecting an optimum density curve, and
solving for a crossover time at which the best fit line for each pixel crosses the optimum density curve.

32. The method of claim 31, further comprising the step of creating an image in which a value of each pixel is a function of the crossover time.

33. A method of monitoring change with time of an image comprising a plurality of pixels, each pixel having a density that is a function of time, comprising the steps of:
receiving densities of the pixels at a plurality of times;
accumulating to a first parameter sum for each pixel a first function of the density and the time;
accumulating to a second parameter sum for each pixel a second function of the density and the time;
accumulating to a third parameter sum for each pixel a third function of the density and the time; and
deriving a best fit line to a continuum of densities for each pixel as a function of time,
wherein the deriving step uses the first, the second and the third parameter sums associated with each pixel.

34. The method of claim 33, wherein the deriving step includes a polynomial regression.

35. The method of claim 33, further comprising the steps of:
selecting an optimum density curve, and
solving for a crossover time at which the best fit line for each pixel crosses the optimum density curve.

36. The method of claim 35, further comprising the step of creating an image in which a value of each pixel is a function of the crossover time.

* * * * *